INVENTORS
Virgil L. Helgeson &
BY Harlan C. Brantner
E. W. Chrieta
ATTORNEY

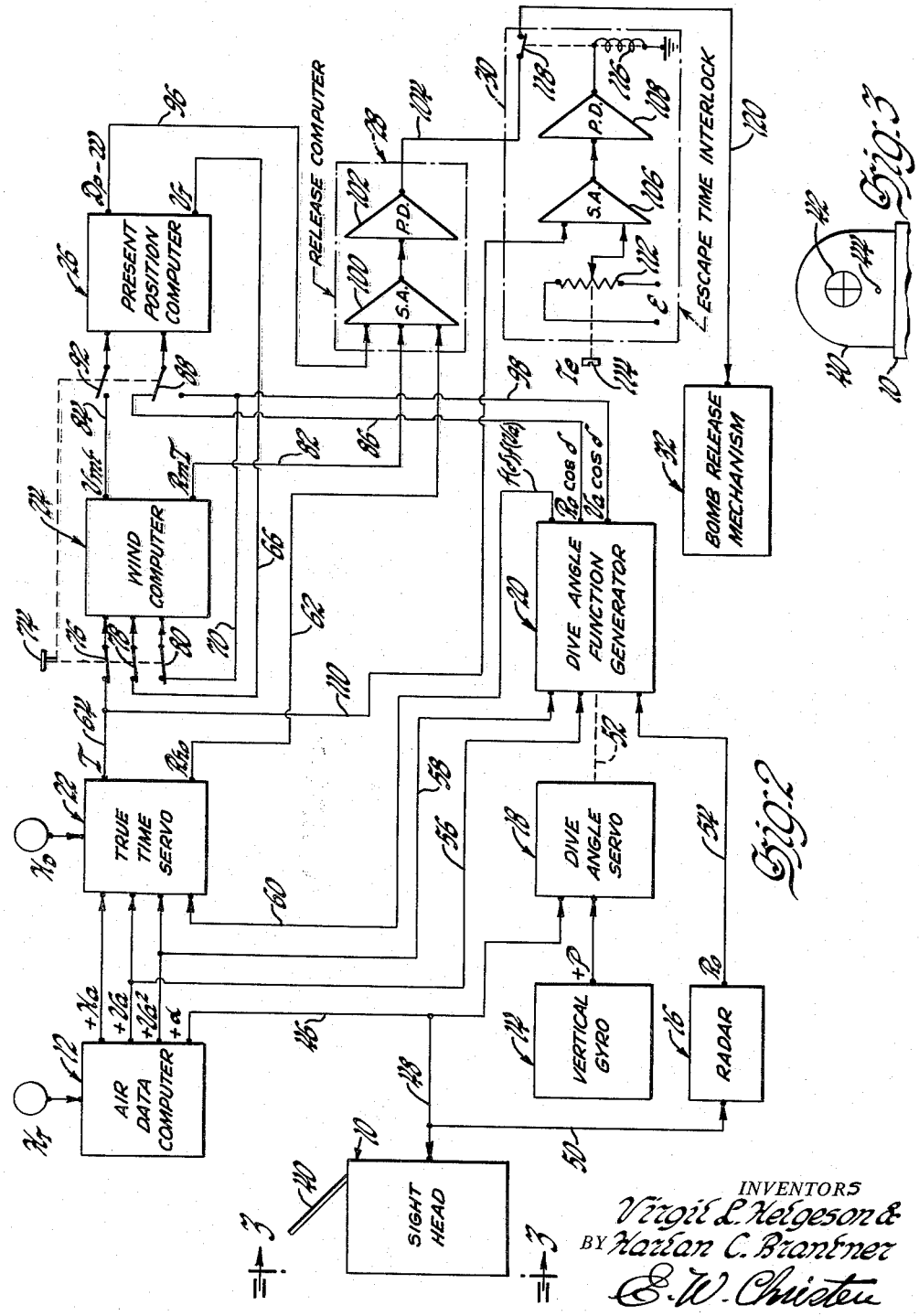

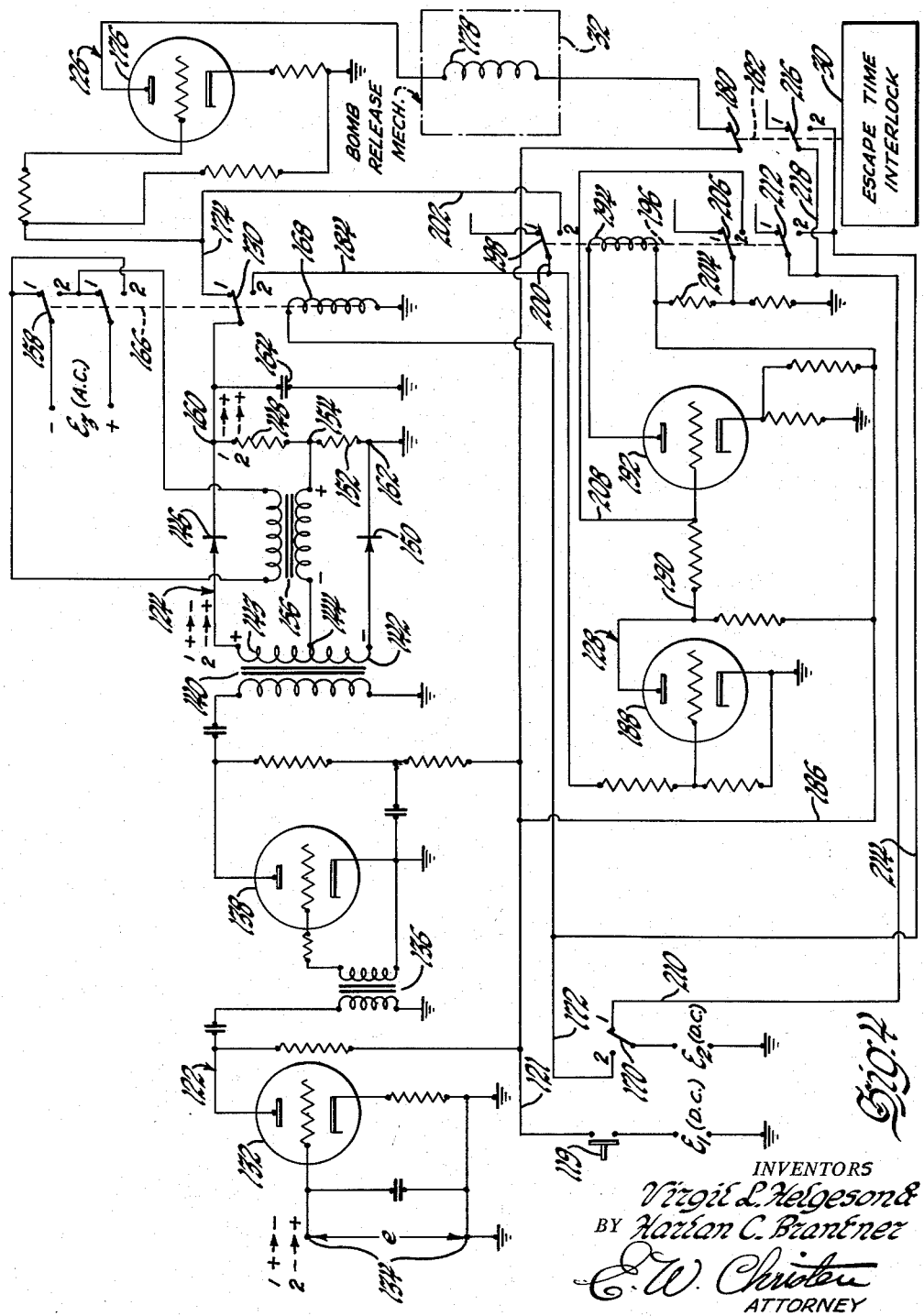

United States Patent Office 2,995,984
Patented Aug. 15, 1961

2,995,984
MULTIPLE SOLUTION BOMBING COMPUTER
Virgil L. Helgeson and Harlan C. Brantner, Milwaukee, Wis., assignors to General Motors Corporation, Detroit, Mich., a corporation of Delaware
Filed July 16, 1956, Ser. No. 598,049
7 Claims. (Cl. 89—1.5)

This invention relates to bombing computer systems and more particularly to bomb release computer circuits.

Bombing computer systems are known which are responsive to continuously derived functionally related data signals to develop a bomb release signal at a point where the aircraft path is tangent to a predicted bomb trajectory intersecting the selected target. In one type of bombing computer system horizontal and vertical distance equations which relate the predicted bomb trajectory and the aircraft and target positions are continuously evaluated to ascertain the bomb release point. This system permits the flight path of the aircraft to be altered or modified in any desired manner after the initial or acquisition phase during which certain initial conditions of the bombing problem are established in the computer system. The only restriction upon the flight path after the initiating point is that it must be confined to the vertical plane through the target and the initiating point. Such a system is disclosed and claimed in the copending application S.N. 598,034 for Bombing Navigational Computer filed on even date herewith by Virgil L. Helgeson and Edward J. Loper and assigned to the assignee of the present invention. This system is especially well adapted for toss bombing operations in which the aircraft is flown on a course which lies in a vertical plane containing the selected target. At some point in this course in the approach toward the target, a pull-up maneuver is initiated and the bomb is released along the pull-up course. In the dive mode of toss bombing the aircraft is flown on a collision course or straight line which intersects the target. In the level mode of toss bombing the aircraft is flown along a horizontal course which lies in a vertical plane containing the target.

In certain bombing operations, it is desirable to obtain more than one solution to the bombing problem in the approach of the aircraft toward the target. This is advantageous in case the first solution is intentionally or unintentionally aborted for any reason. For example, in the delivery of high yield weapons the bomb release mechanism may be rendered inoperable upon the occurrence of a solution if there is insufficient aircraft escape time. It therefore becomes important to be able to utilize the second or subsequent solutions to the bombing problem to assure success of the bombing mission. It is also desirable for tactical reasons in some bombing operations to purposely render the system unresponsive to the first solution and cause bomb release upon the occurrence of the second or subsequent solutions.

Accordingly, it is an object of this invention to provide a bombing computer system which affords first and second solutions to the bombing problem in the approach of the aircraft to the target.

It is another object of this invention to provide a bombing computer system which may be preset to cause bomb release upon the occurrence of either the first or second solution to the bombing problem.

It is another object of the invention to provide a bombing computer system which will automatically cause bomb release upon the occurrence of the second solution in the event the first solution is aborted.

An additional object of the invention is to provide a bombing computer system of the type which continuously evaluates horizontal and vertical distance equations relating the bomb trajectory to the positions of the aircraft and target combined with means for selectably distinguishing between the occurrence of first and second solutions to the bombing problem.

A further object of the invention is to provide a computer circuit adapted to respond selectively to a predetermined value of signal voltage in accordance with the changing or dynamic character of the signal voltage.

A further object is to provide an improved null detecting circuit adapted to distinguish between null values in accordance with the sense or direction of phase reversal incident to the occurrence of the null value.

In accordance with this invention there is provided a bombing computer system in which the bombing problem is represented by a horizontal distance equation relating the instantaneous distance from the target to the predicted horizontal trajectory of the bomb. When these two quantities become equal the bomb release signal is developed and the aircraft will impart to the bomb a trajectory which intersects the target. The aircraft may be maneuvered, in its approach to the target, to cause the value of the horizontal trajectory to increase to a maximum value and, accordingly, first and second solutions to the bombing problem will be realized. The occurrence of each solution is signified by the development of a null signal quantity and means are provided to respond to the dynamic character of the signal quantity to distinguish the null of the first solution from the null of the second solution.

A more complete understanding of the invention may be had from the detailed description which follows taken with the accompanying drawings in which:

FIGURE 2 is a diagrammatic representation of the computer system;

FIGURE 3 illustrates a detail of construction; and

FIGURE 4 is a diagrammatic representation of the release computer affording first and second solutions.

Figure 1:
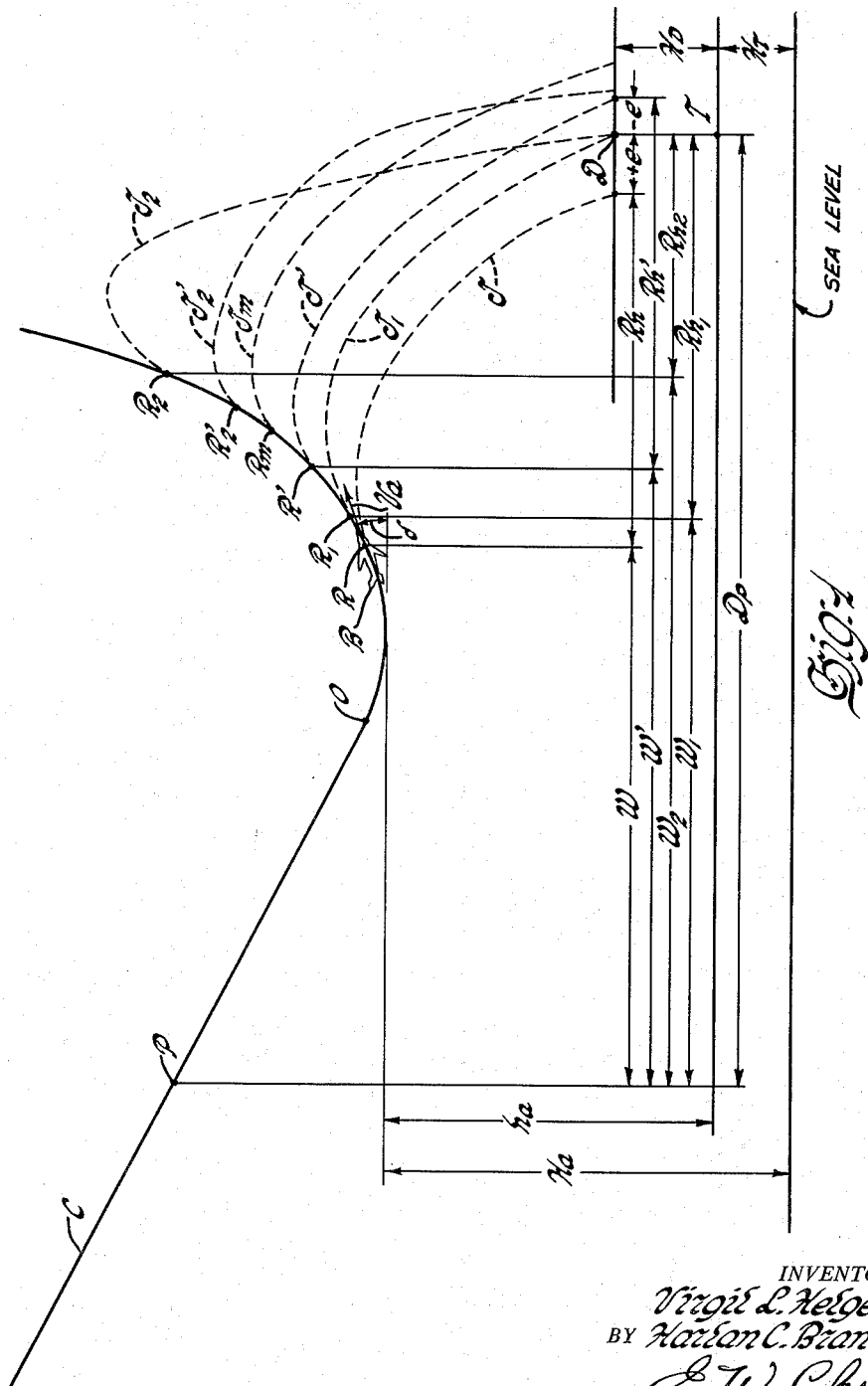
FIGURE 1 is a graphic illustration of the geometry of a typical bombing run.

Referring now to the drawings there is shown an illustrative embodiment of the invention in a multiple mode bombing computer system adapted for manual or automatic selection of first or second solutions to the bombing problem. Before proceeding with a description of the instrumentation of the computer system, it will be helpful to consider the geometry and formulation involved in alternate solution bomb release.

The existence of multiple solutions to the bombing problem may be demonstrated readily by considering a hypothetical situation. In FIGURE 1 there is illustrated the geometry of a typical dive mode toss bombing problem. The bombing aircraft B, in a dive toss operation, approaches the selected target T along a suitable collision course C. The target T is known to be at an altitude $H_T$ above sea level and it is desired to cause bomb burst at the detonation point D which is at an elevation $H_D$ vertically above the selected target. The collision course is a straight line disposed in a vertical plane intersecting the selected target and is established by the pilot in the initial or acquisition phase of the bombing run with the aid of a suitable sight. When the tracking of the target is satisfactory, a manual switch is actuated at the initiating or "pickle" point P to establish initial values of certain variables in the computer system. The initiating point P is at a horizontal distance $D_p$ from the selected target.

After initiating point P in the bombing run the aircraft may be maneuvered in the vertical plane and multiple solutions to the bombing problem will be realized in the approach to the target. In the typical dive toss bombing situation illustrated, the collision course C is maintained beyond the initiating point P to a pull-up point O at which a pull-up maneuver is initiated. The pull-up maneuver, in the example illustrated, causes the aircraft to follow a path in the vertical plane which approximates a circular arc. At any point R in the bombing run the aircraft is at an altitude $h_a$ above the level of the target and at a horizontal distance W from the initiating point P. The aircraft is moving in the air mass with a velocity $V_a$ at a dive angle $\delta$.

For any position R of the aircraft in the pull-up maneuver there is a corresponding bombing trajectory J which will be imparted to the bomb and which has a horizontal component $R_h$ dependent upon conditions at the time of release. The value of the horizontal trajectory is known to be a function of numerous variables including the velocity, altitude, and attitude of the aircraft. If a given pull-up maneuver is initiated at the first point (solution possible point) in the approach to the target which will yield a solution to the bombing problem, then release must occur at the point on the pull-up path which imparts the maximum horizontal trajectory to the bomb in order to cause the bomb to intersect the desired detonation point. For this unique situation for a given maneuver there will be a single solution to the bombing problem, however, any variation from the given pull-up maneuver may cause the occurrence of another solution, as will appear more fully hereinafter. If the given pull-up maneuver is initiated at any point subsequent to the solution possible point there will occur a first and second solution to the bombing problem because the value of the horizontal trajectory will increase to a maximum and then decrease as the target is approached and a solution will occur on either side of the maximum value.

The occurrence of two solutions will become more apparent from considering the variation of the trajectory during the pull-up maneuver. Assume for example that the pull-up maneuver is initiated at the point O, subsequent to the solution possible point, and that bomb release is caused to occur at the point R. The release of the bomb at this point imparts a trajectory J to the bomb which causes the bomb to fall short of the detonation point D by a horizontal distance $e$ resulting in a target miss. A horizontal distance equation of the bombing problem defining the relationship of the distance from aircraft to target and the horizontal trajectory for any position of the aircraft in the bombing run may be written from inspection of the geometry of FIGURE 1 as follows:

$$D_p - W - R = e \tag{1}$$

When the quantity $e$ becomes zero, a successful solution to the bombing problem is obtained and the conditions therefore are defined by the bomb release equation $$D_p - W - R_h = 0 \tag{2}$$

If the aircraft continues on the pull-up course and release is caused at the point $R_1$, a trajectory $J_1$ having a larger horizontal component $R_{h1}$ will be imparted to the bomb which intersects the detonation point D and represents a target hit. This is a first solution to the bombing problem and the conditions therefore are defined by the first solution equation $$D_p - W_1 - R_{h1} = 0 \tag{3}$$

If bomb release is caused to occur at a point R' on the pull-up course, a trajectory J' having a further increased horizontal component $R_h'$ results which causes the bomb to fall beyond the detonation point D by a horizontal distance $e$ resulting in a target miss. This relationship is defined by the equation $$D_p - W' - R_h' = -e \tag{4}$$

At a release point $R_m$ the trajectory $J_m$ results which represents the maximum horizontal toss of the bomb for the given pull-up maneuver and if the aircraft continues on the pull-up course beyond the release point $R_m$, the horizontal component of the trajectory begins to decrease. For example, if release of the bomb is caused at the point $R_2'$ a trajectory $J_2'$ results which has a horizontal component less than that corresponding to the maximum toss but greater than the horizontal distance from the aircraft to the detonation point. Accordingly, the bomb falls beyond the detonation point resulting in a target miss. If the pull-up maneuver is continued to some release point $R_2$, the horizontal trajectory $J_2$ will have decreased sufficiently to intersect the detonation point D resulting in a target hit which represents the second solution to the bombing problem. Since the horizontal component of the bomb trajectory is continually decreasing after the occurrence of the release point corresponding to maximum toss, any release point in the given pull-up maneuver subsequent to $R_2$ will cause the bomb to fall short of the detonation point and result in a target miss. The conditions for the second solution to the bombing problem are defined by the equation $$D_p - W_2 - R_{h2} = 0 \tag{5}$$

It is to be noted that the first and second solutions, represented by Equations 3 and 5, correspondent to different roots of the general bomb release equation $$D_p - W - R_h = 0 \tag{2}$$

The two sets of conditions which cause the quantity $e$ on the righthand side of the equation to become zero result from different particular values of W and $R_h$ while the distance $D_p$ remains the same for a given bombing problem. In order to distinguish the occurrence of the first solution from the second solution, the dynamic character of the quantity $e$, representing the horizontal distance that the bomb misses the detonation point, may be utilized. It will be noted that the horizontal distance $e$ in Equation 1 is of positive value prior to the occurrence of the first solution and of negative value subsequent to the first solution. The quantity $e$ remains negative until occurrence of the second solution and then becomes positive. It is therefore apparent that the changing or dynamic character of the quantity $e$ is opposite for the first and second solutions.

In order that the equation of the bombing problem may be mechanized conveniently, it is necessary to express it in terms of readily available data. The distance $D_p$ may be obtained from any suitable distance measuring equipment. It may be derived conveniently from radar as $$D_p = R_0 \cos \delta \tag{6}$$

where $R_0$ = the slant range from aircraft to target.
$\delta = p + \alpha$
$P$ = pitch angle of the aircraft.
$\alpha$ = angle of attack of the aircraft.

The distance W that the aircraft has traversed from the initiating point P may be derived by integrating the velocity relative to the target with respect to time. This is expressed as $$W = \int_P^R V_T dt \tag{7}$$

$$V_T = V_a \cos \delta - V_{mT} \tag{8}$$

$$W = \int_P^R (V_a \cos \delta - V_{mT}) dt \tag{9}$$

where $V_T$ = velocity of the aircraft relative to the target.
$V_a$ = velocity of aircraft relative to the air mass.
$V_{mT}$ = velocity of the air mass relative to the target.

The horizontal component $R_h$ of the bomb trajectory may be considered as having two components; namely, (1) the horizontal component $R_{ho}$ in air mass coordinates, and (2) the horizontal component $R_{mT}$ due to the relative motion of the air mass and target.
Thus $$R_h = R_{ho} + R_{mT} \tag{10}$$

The term $R_{ho}$ is readily derived by a known computer, as set forth in the above-mentioned copending patent application, by solving the empirical equations $$H_f = AT^2 + BT + C \tag{11}$$
$$R_{ho} = DT^2 + ET + F \tag{12}$$

where $H_f = H_a - (H_T + H_D) =$ height of fall of the bomb from aircraft to detonation point.

$T =$ the true time of fall of the bomb from the aircraft to the detonation point.

The coefficients A, B, C, D, E, and F are of the form $$A = A_0 + A_1 \sin \delta + A_2 \cos \delta + A_3 V + A_4 V \sin \delta + A_5 V \cos \delta + A_6 V^2 + A_7 V^2 \sin \delta + A_8 V^2 \cos \delta$$

and the constants $A_0$, $A_1$, $A_2$, etc. are determined by the method of least squares approximation to the ballistics tables. The term $R_{mT}$ may be derived as a function of the air mass velocity relative to the target and the time of fall $$R_{mT} = V_{mT} T \tag{13}$$

From the foregoing Expressions 5, 9, and 13 the bombing problem Equation 1 may be written as $$R_0 \cos \delta - \int (V_a \cos \delta - V_{mT}) dt - R_{ho} - V_{mT} T = e \tag{14}$$

or $$D_p - \int_P^R V_T dt - R_{ho} - R_{mT} = e \tag{14'}$$

The computer system for mechanization of the bombing problem Equation 14' to provide bomb release signals selectively upon the occurrence of the first and second solutions is illustrated in FIGURES 2, 3, and 4. The computer system components for developing and modifying data signal voltages which represent the system parameters are generally conventional and well known in the art. Accordingly, the system is illustrated in schematic fashion for the sake of clarity. The signal voltages and exciting voltages, unless specified otherwise, are alternating voltages. The relative phase of the voltages is designated by the convention of plus and minus symbols in which those voltages with like symbols are of the same phase and those with unlike symbols are opposite in phase. In general, the system comprises a sight 10 for tracking of the selected target and certain data signal sensing devices including the air data computer 12, the vertical reference 14, and the radar system 16. Signal modifying means are provided which include the dive angle servo 18 and the dive angle function generator 20. The function generator 20 supplies signal voltages to the true time servo 22, the wind computer 24, and the present position computer 26 each of which supplies a signal to the release computer 28. The release computer combines the input signals and upon the occurrence of a predetermined resultant, develops an actuating voltage which is applied through the escape time interlock 30 to the release mechanism 32.

The sight 10 is of any suitable type adapted to facilitate accurate tracking of a selected target by the pilot of the aircraft. It is desirably of the type which includes a combining glass 40 upon which is projected a fixed reticle 42 and a movable pipper 44. The movable pipper 44, having a reference position corresponding to the zero lift line of the aircraft, is adjustably positioned in elevation by a servo driven optical projection system in accordance with the attack angle of the aircraft. The position of the pipper then corresponds to the velocity vector of the aircraft. Therefore the pilot achieves accurate tracking of the target by adjusting the attitude of the craft so that the movable pipper 44 is centered on the target.

In order to develop data signal voltages which represent the system variables a group of data sensing and converting instruments is provided. The air data computer 12 is a converter system responsive to selected air pressures to develop signal voltages corresponding to certain parameters of the aircraft position and motion. The air data computer may be of a type furnished by Servomechanisms Inc. currently available as Model No. AXC-129. The computer 12 includes a manually adjustable input member designated $H_T$ for introducing information relative to the height of the selected target above the sea level. The computer develops output signal voltages corresponding to the height above the target $H_a$, the true air speed $V_a$, the square of the true air speed $V_a^2$, and the attack angle $\alpha$ of the aircraft. The attack angle signal voltage $\alpha$ is applied by a conductor 46 and conductor 48 to the sight 10. The attack angle signal voltage $\alpha$ is also supplied through conductor 50 to the radar system 16 to permit accurate tracking of the target by the radar antenna to develop the signal voltage $R_0$ representative of the slant range from aircraft to target. The vertical reference 14 is suitably a conventional vertical gyroscope pick-off which develops a signal voltage output corresponding to the pitch angle, $p$, of the aircraft. The various data signal voltages are utilized in the computer stages in a manner to be described presently.

The dive angle servo 18 is a closed loop servomechanism which responds to the algebraic sum of pitch and attack angle voltages $p$ and $\alpha$, respectively, to angularly position a mechanical output shaft 52 in accordance with the instantaneous dive angle, $\delta$, of the aircraft. The shaft 52 is drivingly connected with the dive angle function generator 20. The dive angle function generator 20 comprises plural resolvers and potentiometers to generate the desired mathematical functions of the input signal voltages. The dive angle function generator is provided with a slant range input signal voltage $R_0$ on conductor 54 from the radar system 16. It is also supplied with true airspeed input signal voltages $V_a$ and $V_a^2$ from the air data computer on conductors 56 and 58, respectively.

A group of output signal voltages developed in function generator 20, designated by the notation $f(\delta)$ $f(V_a)$, represent selected functions of the aircraft dive angle and true airspeed. The specific functions involved are not important to the present invention and the notation is employed in the interest of clarity. This group of signal voltages is applied, as indicated, by conductor 60 to the true time servo 22.

The true time servo 22 is an implicit computer which solves an empirical relationship for evaluating the true time of fall, T, of the bomb and the horizontal distance, $R_{ho}$, in air mass coordinates, that the bomb will travel during its fall. The input signal voltages to the true time servo include, in addition to the functions $f(\delta)$ $f(V_a)$, the aircraft elevation signal voltage $H_a$ and the aircraft velocity signal voltages $V_a$ and $V_a^2$ from the air data computer. An additional input to the true time servo is the bomb detonation elevation which may be established by adjustment of the manual control device designated $H_D$. The true time servo solves the aforementioned empirical Equations 11 and 12. The evaluation of these equations yields a value for $R_{ho}$ which represents the horizontal distance in air mass coordinates that the bomb will travel during its fall. This quantity is represented by a signal voltage on the conductor 62 which is connected to the input of the release computer 28.

The wind computer 24 is adapted to develop a range wind signal voltage, $V_{mT}$, which corresponds to the velocity of the air mass relative to the target. The wind computer is essentially a closed loop servomechanism which is responsive to the algebraic sum of the horizontal component of aircraft velocity relative to the target and the horizontal component of aircraft velocity relative to the air mass. The instantaneous velocity of the air mass relative to the target is derived by solution of the equation $$V_{mT} = V_T - V_a \cos \delta \quad (15)$$

The input signal voltage $V_T$ to the wind computer corresponding to the velocity of the aircraft relative to the target is supplied from the output of the present position computer 26 by the conductor 66 and the signal voltage, $V_a \cos \delta$, corresponding to the velocity relative to the air mass is supplied from the dive angle function generator by conductors 98 and 70. Additionally, the wind computer is effective to develop a signal voltage $$R_{mT} = V_{mT} T \quad (16)$$

corresponding to the horizontal distance the bomb will travel due to the range wind. For this purpose, the wind computer receives the true time of fall signal voltage T from the true time servo 22 on conductor 64. A manually actuated initiating switch 74 is provided with switch contacts 76, 78, and 80 to permit interruption of the input circuits 64, 66, and 70, respectively, at the initiating point P in the bombing run. Accordingly, the value of the air mass velocity relative to the target at the initiating point is memorized in the wind computer for use in the subsequent computer stages during the bombing run. The output signal voltage $R_{mT}$ is applied through conductor 82 to the release computer 28. The sum of the signal voltages $R_{ho}$ and $R_{mT}$, applied to the release computer, corresponds to the term $$R_h = R_{ho} + R_{mT} \quad (10)$$

The present position computer 26 is adapted to develop a signal voltage corresponding to the instantaneous horizontal distance from the aircraft to the target. Prior to the initiating point P the present position computer is operated as a servo repeater. At the initiating point P the horizontal distance to target is memorized and the computer operation is changed to that of an integrator. Therefore, prior to the initiating point, the input signal voltage of the present position computer is the horizontal range signal voltage $R_0 \cos \delta$ supplied from the dive angle function generator 20 by the conductor 86 through the contacts 88 of initiating switch 74. The computer develops an output signal voltage $V_T$, corresponding to the horizontal component of aircraft velocity relative to the target, by taking the first time derivative of the distance signal $R_0 \cos \delta$. This voltage is supplied by conductor 66 to the wind computer. After the initiating point P and the actuation of the switch 74, the input to the present position computer includes the horizontal component of aircraft velocity relative to the target from the dive angle function generator on conductor 98 through switch contacts 88 and the velocity of the air mass relative to the target $V_{mT}$ from the wind computer on conductor 84 through switch contacts 92. After the actuation of the initiating switch 74, the computer solves for the distance from the initiating point P from the relation $$W = \int_P^R (V_a \cos \delta - V_{mT}) dt = \int_P^R V_T dt \quad (17)$$

The instantaneous distance to target is derived from $$D_p - W = D_p - \int_P^R V_T dt \quad (18)$$

as an output signal voltage on conductor 96 which is connected to release computer 28.

The release computer 28 is adapted to develop an output signal voltage selectively in response to first and second solutions to the bombing problem and comprises a conventional summing amplifier 100 and a phase sensitive amplifier 102, which will be described in greater detail subsequently, to provide an output upon the occurrence of a null summation of input signal voltage. The signal voltages, corresponding to the terms of the bombing problem equation, $$D_p - \int_P^R V_T dt - R_{ho} - R_{mT} = 0 \quad (14')$$

are supplied to the release computer and when the quantity becomes zero for the solution selected an output bomb release signal voltage is developed on conductor 104 and applied to the escape time interlock 30.

When the time of fall of the bomb is less than the escape time $T_e$, the interlock 30 operates to interrupt the bomb release signal circuit. For this purpose, the escape time interlock includes conventional summing amplifier 106 and phase detector 108 which receive as input signals, the signal voltage T from the true time servo on conductor 110 and the predetermined value of the escape time, $T_e$. The latter signal is provided by the potentiometer 112 which is excited from a voltage source E and has a movable contact which may be displaced proportionally to the predetermined value of escape time by a manual control device 114. The summing amplifier develops an output voltage corresponding to the algebraic sum of the input voltages and if the escape time $T_e$ exceeds the time of fall T, the phase detector develops an actuating signal which is applied to relay 116. Actuation of the relay opens the normally closed switch contacts 118 in the conductor 104 which carries the bomb release signal. When the time of fall is greater than the escape time, the contacts 118 are closed and the bomb release signal is applied by the conductor 120 to the bomb release mechanism 32 to effect bomb release. The computer system just described represents the mechanization of the bombing problem Equation 1 and is effective to cause automatic bomb release at an appropriate point in the pull-up path of the bomber aircraft to impart a trajectory to the bomb which will intersect the selected target.

In accordance with this invention the release computer 28 is adapted to provide for automatic and manual selection of either the first or the second solution to the bombing problem. The phase detector 102, shown in block diagram form in FIGURE 2, is adapted to perform this function and the illustrative embodiment of the circuitry is shown in FIGURE 4. In general, the phase detector comprises an amplifier section, designated generally at 122, which receives the signal voltage $e$ and applies an amplified version thereof to a phase responsive circuit designated generally at 124. The output of the phase responsive circuit is applied to the release amplifier 126 and thence to the bomb release mechanism 32. The output of the phase responsive circuit 124 may be applied directly to the release amplifier 126 or indirectly through a switching circuit, designated generally at 128, in accordance with the position of the selector switch 130.

To facilitate explanation of this circuitry, the two positions of the movable switch contacts are labelled with numerals 1 and 2 which correspond to first and second solutions or modes of operation. The amplifier circuits are energized from a common power supply or source of high direct voltage $E_1$ through a manual push button switch 119 preferably actuated in unison with the initiating switch 74 (FIGURE 3) and through a supply bus or conductor 121 and a common or ground return circuit.

The amplifier section 122 suitably comprises an amplifier stage including vacuum tube 132 having an input circuit including a pair of input terminals 134 connected between the control and cathode electrodes. The signal voltage $e$ developed by the summing amplifier 100 (FIGURE 3) is applied to the input terminals 134. The output voltage of the amplifying device 132 is developed in the output circuit which extends between the plate and cathode electrodes and includes coupling transformer 136. Further amplification of the signal voltage is provided by the succeeding amplfying stage including vacuum tube 138 in a similar manner and the amplified signal voltage is applied to the phase responsive circuit 124 through a coupling transformer 140 having secondary winding portions 142 and 143.

The phase responsive circuit 124 is suitably of the bridge type and receives the input signal voltage from the secondary winding of transformer 140. One pair of conjugate arms of the bridge extends from the center tap 144 on the secondary winding through the rectifier 146, in the forward direction, and resistor 148. The other pair of conjugate arms extends from the center tap 144 through the rectifier 150, in the forward direction, and resistor 152 to the common junction 154. A reversible phase voltage is introduced in the diagonal arm of the bridge between the center tap 144 and junction 154 by the transformer 156. The transformer 156 is energized from the reference voltage source $E_3$ through a reversing switch 158. The output voltage of the phase responsive circuit 124 is derived across the diagonal terminals 160 and 162 of the bridge. The terminal 160 is connected with the movable contact of the selector switch 130 and the terminal 162 is connected to a point of common reference potential. A filter condenser 164 is suitably provided across the output terminals.

The selector switch 130 has a contact movable between positions 1 and 2 actuated by a linkage 166 from the selector relay 168. To provide for manual operation, the relay 168 may be energized from a voltage source $E_2$ through a manual selector switch 170 and conductor 172.

With the selector switch 130 in position 1, the output of the phase responsive circuit 124 is supplied directly through conductor 174 to the release amplifier 126. The release amplifier 126 is a direct current power amplifier including a vacuum tube 176 which receives the input signal voltage on conductor 174 between the grid electrode and the cathode electrode. The output circuit of the amplifier 126 extends between the plate electrode and the cathode electrode and includes a relay 178 in the bomb release mechanism 32. The output circuit of the amplifier 126 also includes in serial connection, normally closed switch contacts 180 which are actuable by the relay of the escape time interlock 30 through a linkage 182.

When the selector switch 130 is in position 2, the output signal voltage of the phase responsive circuit 124 is applied through conductor 184 to the switching circuit 128. The power supply voltage for the switching circuit 128 is supplied from the bus 121 through the conductor 186. The switching circuit comprises a first direct current amplifier stage including vacuum tube 188 which receives the signal voltage on conductor 184 in an input circuit which extends between the grid electrode and the cathode electrode. The output circuit, extending between the plate electrode and the cathode electrode, is resistance coupled to a second direct current amplifier stage through conductor 190. The second amplifier stage includes a vacuum tube 192 having an input circuit including conductor 190 extending between the grid electrode and the cathode electrode. The output circuit of vacuum tube 192 extends between the plate electrode and the cathode electrode and includes a switching relay 194.

The switching relay 194 includes linkage 196 for actuating normally open switch contacts 198 to complete a circuit from the selector switch 130 through conductor 184, conductor 200, contacts 198 and conductor 202 to the input circuit of the release amplifier 126. A holding circuit for the switching relay 194 is provided which includes a voltage divider 204 energized from the power supply voltage through conductor 186. A switch 206 has a movable contact connected with the voltage divider and actuated by the relay linkage 196 to apply a bias voltage through conductor 208 to the input of the vacuum tube 192 to maintain conduction thereof. A holding circuit for the selector relay 168 is also provided, when the manual selector switch 170 is in position 1, which extends from the voltage source $E_2$ through the manual selector switch 170, conductor 210 to a switch 212. The switch 212 has a movable contact connected with the conductor 210 and actuated by the switching relay 194 to complete a circuit through conductor 214 to the selector relay 168 to provide energization thereof.

To provide for automatic operation of the selector switch 130 to position 2, the escape time interlock 30 is adapted to complete an energizing circuit for the selector relay 168. This circuit includes a switch 216 having a movable contact which is actuable in unison with the switch 180 by the linkage 182. The energizing circuit may be traced from the voltage source $E_2$ through the manual selector switch 170, conductor 210, conductor 218, switch 216 and thence through conductor 214 to the selector relay 168.

In operation of the inventive multiple solution bomb release computer system, certain of the system parameters are preferably established in pre-flight procedure in accordance with known or predetermined values. The value of the altitude of the selected target above sea level is established in the air data computer 12 by adjustment of the manual control device $H_T$ and the selected value of detonation altitude $H_D$ is established in the true time servo 22 by adjustment of the control device $H_D$. The value of escape time which is determined in accordance with aircraft performance and bomb yield is set in the escape time interlock 30 by adjustment of the control knob 114. The first or second solution to the bombing problem is selected by operation of manual selector switch 170.

With the aircraft in flight, the bombing run may be initiated by establishing the dive approach course toward the selected target. During this initiation or acquisition phase of the run, the pilot commences tracking of the target with the aid of the sight 10. The air data computer 12 supplies attack angle information to the sight 10 and to the radar 16 to permit accurate tracking. The radar 16 continuously derives the slant range signal voltage and supplies it to the dive angle function generator. The dive angle servo 18 receives attack angle information from the air data computer 12 and pitch angle information from the vertical gyro 14 and continuously maintains the input shaft to the dive angle function generator in an angular position corresponding to the instantaneous value of the dive angle of the aircraft.

The true time servo 22 receives data signals from the air data computer 12 and selected dive angle and velocity functions from the dive angle function generator 20 and continuously computes the horizontal trajectory of the bomb in air mass coordinates. The true time servo also continuously computes the true time of fall of the bomb.

The wind computer 24 is supplied with velocity information relative to the target and relative to the air mass to derive a signal corresponding to the velocity of the air mass relative to the target. This latter signal is combined in the wind computer with the true time of fall information to develop a signal corresponding to the component of horizontal trajectory imparted to the bomb by the movement of the air mass. The distance from the aircraft to the target is continuously developed in the present position computer 26 in response to the horizontal component of the slant range supplied from the dive angle function generator 20.

When the tracking of the target has become satisfactory in the approach course, the pilot manually actuates the initiating switch 74. This is effective to interrupt the input information to the wind computer and accordingly the value of the air mass velocity relative to the target is memorized by the computer at the initiating point.

Actuation of the initiating switch 74 also interrupts the range to target information supplied to the present position computer. This is effective to cause the computer to memorize the distance from the initiating point to the target and to change the input information to velocity of the air mass relative to the target and velocity of the aircraft relative to the air mass. Accordingly, the present position computer develops a signal corresponding to the velocity of the aircraft relative to the target which is integrated continuously with respect to time and subtracted from the distance of the initiating point from the target.

Therefore, after the occurrence of the initiating point, information corresponding to the terms of the bombing problem Equation 1 is developed and applied to the release computer 28. This information includes the horizontal component of the bomb trajectory in air mass coordinates from the true time servo 22, the horizontal component of the bomb trajectory imparted by the motion of the air mass from the wind computer 24, and the horizontal distance from the aircraft to the target supplied from the position computer 26.

This information, as previously described, is combined by release computer 28 in accordance with the bombing problem equation. The output signal voltage $e$ of the release computer undergoes a phase reversal in one direction upon the occurrence of the first solution and a phase reversal in the other direction upon the occurrence of the second solution. The selection of one solution or the other is effected by the phase detector 102 which develops a bomb release signal on conductor 104 which is transmitted through switch 118 to the bomb release mechanism 32 to cause bomb release upon occurrence of the appropriate solution. Actuation of the bomb release mechanism is prevented by the escape time interlock 30 in case the escape time is insufficient. If the escape time signal voltage exceeds the true time signal voltage the summing amplifier 106 applies a voltage to phase detector 108 which causes relay 116 to be energized. As a result switch 118 is opened and the bomb release signal path is interrupted and the selected solution is aborted.

The operation of the automatic and manual selection of first and second solution will be described with reference to FIGURE 4. To aid in the explanation the previously mentioned convention of plus and minus symbols will be employed to designate the relative phase of the voltages. In this case the phase designated by the plus symbol will be arbitrarily referred to as the reference phase. For additional clarity the position of a switch or the phase of a signal corresponding to the first solution is designated by the numeral 1 and that corresponding to the second solution is designated by the numeral 2. As designated in FIGURE 3, the phase of the signal voltage $e$ changes from plus to minus upon the occurrence of the first solution. The selective response by the phase detector to the changing character of the signal voltage will be described presently.

First consider the operation when the first solution is selected by the manual selector switch 170 in position 1. The phase detector is energized from the power supply voltage E, by closing of manual switch 119 simultaneously with the actuation of the initiating switch 74. The supply voltage $E_2$ is connected through conductor 210 to an open circuit at switch 212 and an open circuit at switch 216 and accordingly all switch contacts remain in position 1. When the signal voltage $e$ is of the reference phase, designated by the plus symbol, the amplified version thereof appears across the secondary of the coupling transformer 140 with the same phase and is applied to the phase responsive circuit 124. The phase responsive circuit is excited from the voltage source $E_3$ through the reversing switch 158 and transformer 156 with a voltage of the phase indicated. Since the phase of the signal voltage in the transformer winding 142 and the voltage in transformer 156 is the same, the conjugate bridge arms including the rectifier 150 and resistor 152 is rendered conductive on alternate half cycles. Accordingly, a direct voltage with the polarity indicated is developed across terminals 160 and 162 and applied through the selector switch 130, in position 1, and conductor 174 to the input circuit of the release amplifier 126. This negative input signal maintains conduction of the tube 176 sufficiently low so that the relay 178 in the bomb release mechanism is not effectively energized.

This condition of the phase detector is maintained until the amplitude of the signal voltage $e$ decreases to a zero or null value signifying the occurrence of the first solution. Incident to the dynamic null is a phase reversal and the phase of the signal voltage $e$ becomes opposite the reference phase, as designated by the negative symbol. For this condition, the amplified version of the signal voltage, which is applied through coupling transformer 140 to the input of the phase responsive circuit 124, is also opposite the reference phase. The phase of the reference voltage $E_3$ introduced through transformer 156, however, remains the same. Accordingly, the voltages appearing across the transformer winding 143 and transformer 156 are in phase agreement and the pair of conjugate arms including rectifier 146 and resistor 148 become conductive on alternate half cycles. Accordingly, a voltage of positive polarity appears across the terminals 160 and 162 and is applied through the selector switch 130 and conductor 174 to the input circuit of the release amplifier 126. This causes the vacuum tube 176 to become sufficiently conductive to effectively energize the relay 178 in the bomb release mechanism. This energizing circuit extends from the power supply voltage $E_1$ through conductor 121, normally closed switch contacts 180 to the relay 178 and tube 176 to ground. This condition of the phase detector circuit is maintained so long as the input signal voltage $e$ is opposite the reference phase or until the selector switch 130 is actuated to position 2. Therefore, when switch contacts 180 are closed bomb release is caused upon the occurrence of the first solution.

If upon the occurrence of the first solution there is insufficient escape time, the second solution will be automatically selected. The escape time interlock 30 is responsive, upon insufficient escape time, to actuate the switch 180 to the open position and simultaneously, through linkage 182, to actuate switch 216 to position 2. This interrupts the bomb release signal circuit and results in an abortion of the first solution. Closing of switch 216 in position 2 is effective to establish an energizing circuit for the selector relay 168 from the supply voltage $E_2$ through switch 170, conductors 210 and 218, switch 216 and thence through conductor 214 to the relay 168. As a result, the selector switch 130 is actuated to position 2, corresponding to the second solution, and the signal voltage from the phase responsive circuit 124 is applied through conductor 184 to the switching circuit 128. Since this voltage is of negative polarity the conduction of vacuum tube 188 will be decreased and the conduction of vacuum tube 192 will be increased sufficiently to energize the relay 194. This causes the switch 198 to be closed in position 2 which completes a circuit from the conductors 184 and 200 through the switch and conductor 202 to the input of the release amplifier 126. So long as the signal voltage from the phase responsive circuit 124 remains negative the input to the release amplifier is ineffective to cause conduction thereof. The energization of the relay 194 also closed the switch 206 in position 2 and thereby connects a positive bias voltage through conductor 208 to the input circuit of the tube 192 to maintain conduction thereof. Additionally, switch 212 is closed in position 2 completing a circuit from the voltage source $E_2$ through manual selector switch 170, conductor 210, switch 212, conductor 214 to the selector relay 168 to maintain energization thereof.

This condition if the phase detector continues until the input signal voltage $e$ decreases to a null value when the phase reverses from minus to plus which is characteristic of the second solution. Accordingly, the amplified version appearing in the phase responsive circuit 124 across the transformer winding 143 and the voltage of transformer 156 are in phase agreement because selector relay 168 caused actuation of the reversing switch 158 and phase reversal of voltage $E_3$. Conduction occurs through the rectifier 146 and resistor 148 and a positive output voltage is developed. This positive output voltage is applied through selector switch 130, conductors 184 and 200 and switch 198 to the input circuit of the release amplifier 126 causing conduction thereof. This conduction is sufficient to energize the relay 178 in the bomb release mechanism and to effect bomb release at the second solution to the bombing problem.

Consider now the operation when the second solution is selected by placing the manual selector switch 170 in position 2. The selector relay 168 is energized from voltage source $E_2$ through conductor 172 and accordingly selector switch 130 is closed in position 2. Also reversing switch 158 is displaced to position 2. Upon the occurrence of the first solution the signal voltage $e$ undergoes phase reversal from plus to minus. Accordingly, the output of the phase detector at terminal 160 changes from positive to negative polarity and is applied by selector switch to the input of tube 188. When this input is positive, tube 188 is conductive and tube 192 is nonconductive and the switching relay 194 is not energized. Upon the occurrence of the first solution with phase reversal of the input signal voltage $e$, the output voltage at selector switch 130 becomes negative causing tube 188 to be non-conductive and tube 192 to be conductive. Switching relay 194 is energized and switch 198 is closed in position 2. Also switches 206 and 212 are closed in position 2 to establish the holding circuits, previously described for tube 192 and selector relay 168 respectively. Upon the occurrence of the second solution and the incident phase reversal of signal voltage $e$ from minus to plus, the voltage at terminal 160 and selector switch 130 becomes positive in polarity. This positive signal voltage is applied through conductors 184 and 200, switch 198, and conductor 202 to the input of release amplifier 126 causing conduction thereof. Accordingly, relay 178 is energized and bomb release is caused at the second solution to the bombing problem.

Although the description of this invention has been given with respect to a particular embodiment of the invention, it is not to be construed in a limiting sense. Many variations and modifications within the spirit and scope of the invention will now occur to those skilled in the art. For a definition of the invention, reference is made to the appended claims.

What is claimed is:

1. In a bombing computer system for aircraft comprising means for deriving plural data signal voltages, computer means connected therewith for combining the signal voltges in accordance with a predetermined bomb release equation having first and second roots which may be realized in the approach of the aircraft to a selected target, said computer means being adapted to develop an output signal voltage having a null value and phase reversal upon the occurrence of each root with the phase reversal incident to the first root being of one sense and the phase reversal incident to the second root being of the opposite sense, the improvement comprising a phase discriminator connected with the computer means and including means for reversing the phase response thereof whereby the polarity of the output voltage is the same for input voltages of opposite phase to the discriminator, and bomb release means connected with the phase discriminator and being responsive to a given polarity of input voltage to the release means for causing bomb release.

2. In a bombing computer system for aircraft comprising means for deriving plural data signal voltages corresponding to the parameters of the bombing problem for a selected target, computer means conneced therewith for combining the signal voltages in accordance with a predetermined bomb release equation having first and second solutions which may be realized in the approach of the aircraft toward the selected target, said computer means being adapted to develop an output signal voltage having a null value and phase reversal upon the occurrence of each solution with the phase reversal incident to the first solution being of one sense and the phase reversal incident to the second solution being of the opposite sense, the improvement comprising a phase discriminator connected with the computer means and including a reference voltage source connected to the discriminator through a reversing switch for reversing the phase of the reference voltage applied to the discriminator whereby the polarity of the discriminator output voltage is the same for discriminator input voltages of opposite phase and for the first and second solutions, bomb release means responsive to an input voltage of a given polarity for causing bomb release, a selector circuit connected between the discriminator and the bomb release means including a selector switch connected with first solution and second solution circuits, said selector switch and reversing switch being interconnected for simultaneous operation whereby the discriminator output voltage may be applied to the first or second solution circuit in accordance with the desired solution, said first solution circuit being connected with the bomb release means and adapted to transmit voltages of either polarity to cause bomb release upon the occurrence of the first solution, said second solution circuit being connected with the bomb release means and adapted to transmit voltages of one polarity only to cause bomb release upon the occurrence of the second solution.

3. The invention defined by claim 2 wherein the second solution circuit comprises a conductor extending between the selector switch and the release means and having switch contacts therein, and a polarity responsive relay for closing said switch contacts.

4. The invention defined by claim 2 combined with disabling means responsive to predetermined conditions to abort either solution by preventing bomb release, said disabling means including relay means for actuating the selector and reversing switches whereby the second solution is automatically selected when the first solution is aborted by said disabling means.

5. The invention defined by claim 2 wherein the improvement also comprises an escape time circuit including a summing circuit, means connected with summing circuit for developing a signal voltage corresponding to the time of fall of the bomb from the aircraft to the detonation point, means connected with the summing circuit for developing a signal voltage corresponding to the escape time required for the aircraft, a phase discriminator connected with the output of the summing circuit and being adapted to provide disabling signal voltage when the time of fall is less than the escape time, relay means connected with the phase discriminator for energization by the actuating signal, said relay means being connected with the selector and reversing switches whereby the second solution is automatically selected when the first solution is aborted by the escape time circuit.

6. In a bombing computer system for aircraft of the type comprising means for deriving plural data signal voltages corresponding to the parameters of the bombing problem for a selected target, computer means connected therewith for combining the signal voltages in accordance with a predetermined bomb release equation having first and second solutions which may be realized in the approach of the aircraft toward the target, said computer means being adapted to develop an output signal voltage of null value upon the occurrence of each solution with the phase reversal incident to the first solution being of one sense and the phase reversal incident to the second solution being of the opposite sense, the improvement comprising a phase discriminator of the bridge rectifier type including a reference voltage source, switch means for reversibly connecting said source between one pair of opposite junctions of the bridge arms, coupling means for connecting the output signal voltage from the computer means between the other pair of opposite junctions of the bridge arms, a selector switch for connecting said other pair of opposite junctions of the bridge arms to a first solution circuit or a second solution circuit, bomb release means responsive to an input voltage of a given polarity for causing bomb release, said first solution circuit being connected with the bomb release means and adapted to transmit voltages of either polarity to cause bomb release upon the occurrence of the first solution, said second solution circuit being connected with the the bomb release means and adapted to transmit voltages of one polarity only to cause bomb release upon the occurrence of the second solution.

7. In a bombing computer system for aircraft comprising means for deriving plural data signal voltages corresponding to the parameters of the bombing problem for a selected target, computer means connected therewith for combining the signal voltages in accordance with a predetermined bomb release equation having first and second solutions which may be realized in the approach of the aircraft toward the target, said computer means being adapted to develop an output signal voltage of null value upon the occurrence of each solution with the phase reversal incident to the first solution being of one sense and the phase reversal incident to the second solution being of the opposite sense, the improvement comprising a phase discriminator connected with the output of the computer means and including a reference voltage source connected to the discriminator through a reversing switch for reversing the phase of the reference voltage applied to the discriminator whereby the polarity of the discriminator output voltage is the same for discriminator input voltages of opposite phase and for first and second solutions, a selector circuit connected between the discriminator and the bomb release means including a selector switch connected with first and second solution circuits, said selector switch and reversing switch being interconnected for simultaneous actuation whereby the discriminator output voltage may be applied to the first or second solution circuit in accordance with the desired solution, a first relay for actuating the selector and reversing switches, a bomb release means including an amplifier having an output circuit adapted, when energized, to cause bomb release, the first solution circuit being adapted to transmit voltages of either polarity and connected to the input of the amplifier, the second solution circuit comprising first and second parallel circuits, the first parallel circuit including switch contacts therein and extending from the selector switch to the input of the amplifier, the second parallel circuit including phase-reversing amplifiers and a switching relay energized thereby for actuating the switch contacts, the bias voltage relation on said phase-reversing amplifiers being such as to cause the switching relay to be energized upon the phase reversal corresponding to the first solution, said switching relay including holding circuit contacts in circuit with said selector relay to cause the second solution selection to be retained and holding circuit contacts for said switching relay to ensure that the said switch contacts remain closed for application of the signal voltage to the input of said amplifier upon the occurrence of the second solution.

References Cited in the file of this patent

UNITED STATES PATENTS

| | | |
|---|---|---|
| 2,433,284 | Luck | Dec. 23, 1947 |
| 2,609,729 | Wilkenson et al. | Sept. 9, 1952 |
| 2,694,143 | Chambers | Nov. 9, 1954 |
| 2,708,718 | Weiss | May 17, 1955 |
| 2,736,878 | Boyle, Jr. | Feb. 28, 1956 |
| 2,758,511 | McLean et al. | Aug. 14, 1956 |
| 2,790,969 | Blitz | Apr. 30, 1957 |
| 2,898,809 | Ryan | Aug. 11, 1959 |